United States Patent [19]

Baudot

[11] Patent Number: 4,488,041
[45] Date of Patent: Dec. 11, 1984

[54] DEVICE FOR MEASURING THE COORDINATES OF A ROTATING SPHERE AND PROCESS FOR MANUFACTURING PART OF THIS DEVICE

[75] Inventor: Jean-Jacques Baudot, Ville D'Avray, France

[73] Assignee: Societe Anonyme de Telecommunications, Paris, France

[21] Appl. No.: 378,197

[22] Filed: May 14, 1982

[30] Foreign Application Priority Data

May 18, 1981 [FR] France .................. 81 09876

[51] Int. Cl.³ ............................................. G01C 19/28
[52] U.S. Cl. .................. 250/231 GY; 74/5.6 A
[58] Field of Search ................. 250/231 SE, 231 GY; 33/317 R, 318, 324, DIG. 3; 74/5.6 A

[56] References Cited

U.S. PATENT DOCUMENTS 2,959,060  11/1960  Kunz ..................... 250/231 GY
3,328,595   6/1967  Todd, Jr. ................ 250/231 GY

*Primary Examiner*—David C. Nelms
*Assistant Examiner*—Ernest Austin, II

[57] ABSTRACT

Device for determining the orientation of an axis, mobile about a point, of a solid in rotation about this axis, particularly a gyroscopic spinner, wherein said device comprises a portion of sphere centered on said point of said axis, of which the surface comprises at least two parts which are respectively absorbent and reflecting for a given radiation, and sensor means sensitive to the radiation reflected by the sphere, the reflecting and absorbent parts being shaped so that the sensor means deliver signals characteristic of the orientation of said axis.

11 Claims, 5 Drawing Figures

DEVICE FOR MEASURING THE COORDINATES OF A ROTATING SPHERE AND PROCESS FOR MANUFACTURING PART OF THIS DEVICE

BACKGROUND OF THE INVENTION

The present invention relates to a device for determining the orientation of an axis, mobile about a point, of a solid rotating about this axis, particularly of a gyroscopic spinner.

Let us consider a sphere, or a portion of sphere, moved in rotation about an axis, preferably its axis of symmetry, said axis being capable of a movement with two degrees of freedom, by means for example of a gimbal-type suspension, i.e. mobile about a fixed point.

It is already known to determine the orientation or to measure the angular coordinates of such a system by placing known angular sensors, such as potentiometers, inductive resolvers, optical coders, on the gimbal axes. However, it is often difficult to have access to the gimbal axes to install this type of sensor therein, either because the general dimensions of the suspension are too small relative to the size of the sensors, or because the gimbal-type suspension is partly concealed inside the spinner for example.

Moreover, when the two degrees of freedom of the axis are not allowed by a gimbal-type suspension, but by a ball joint, access is then physically impossible.

Moreover, all the existing sensors exert appreciable spurious torques on the axes of the suspension, which may falsify measurements.

It is an object of the present invention to overcome these drawbacks and to propose a measuring device in which absolutely no torque is exerted on the spinner, and which can be reduced to a very small scale.

SUMMARY OF THE INVENTION

To this end, the present invention relates to a device for determining the orientation of an axis, mobile about a point, of a solid rotating about this axis, particularly of a gyroscopic spinner, wherein said device comprises a portion of sphere centred on said point of said axis, whose surface comprises at least two parts, respectively absorbent and reflecting for a given radiation, and sensor means sensitive to the radiation reflected by the sphere, the reflecting and absorbent parts being shaped so that the sensor means deliver signals characteristic of the orientation of said axis.

In a preferred embodiment of the invention, the surface of the sphere is divided into two parts by a curve whose equation is a monotonic function.

In this case, one of these two parts may be reflecting, the other absorbent.

However, at least one of the two parts may also have a constant or progressively variable albedo.

One of the two parts of the surface of the sphere may also comprise alternately absorbent and reflecting meridian lines, the other part remaining for example reflecting.

BRIEF DESCRIPTION OF THE DRAWINGS

The invention will be more readily understood on reading the following description of several preferred embodiments of the device, made with reference to the accompanying drawings, and of an example of a process for making the sphere or the portion of sphere whose coordinates are to be measured. In the drawings.

DETAILED DESCRIPTION OF PREFERRED EMBODIMENT OF THE INVENTION

Figure 1:
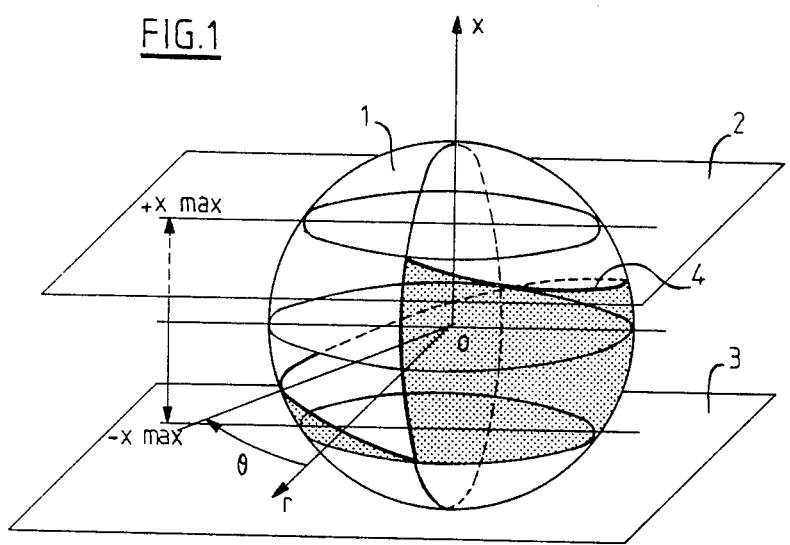
FIG. 1 shows a view in perspective of a first embodiment of the sphere according to the invention whose angular coordinates are to be measured.

Referring now to the drawings, FIG. 1 shows a sphere 1, with centre O, fast with a gyroscopic spinner of axis Ox, and adapted to be rotated about this axis Ox, of which it is desired to know the coordinates. On the sphere 1 is defined a zone between two planes 2 (at the top) and 3 (at the bottom) normal to axis Ox, and of respective equations $x = -x_{max}$ and $x = +x_{max}$, $x_{max}$ being a predetermined value, as will be seen hereinafter.

On the surface of the above-mentioned zone is defined a curve 4, of equation $x = f(\theta, \text{modulo } 2\pi)$, $\theta$ being the angle of rotation of the sphere 1 about the axis Ox counted from an axis of reference Or, and such that $f(O) = -x_{max}$ and $f(2\pi) = +x_{max}$, and that $f(\theta)$ is monotonic over the whole distance $[O, 2\pi]$. A monotonic function is a function always varying in the same direction.

In the example described, the equation of this curve is:

$$x = x_{max}\left(\frac{\theta}{\pi} - 1\right)$$

(1) over the distance $O \leq x < 2\pi$.

This curve divides the above-mentioned zone into the half-zones in "saw-tooth" form, and placed head to tail.

Figure 2:
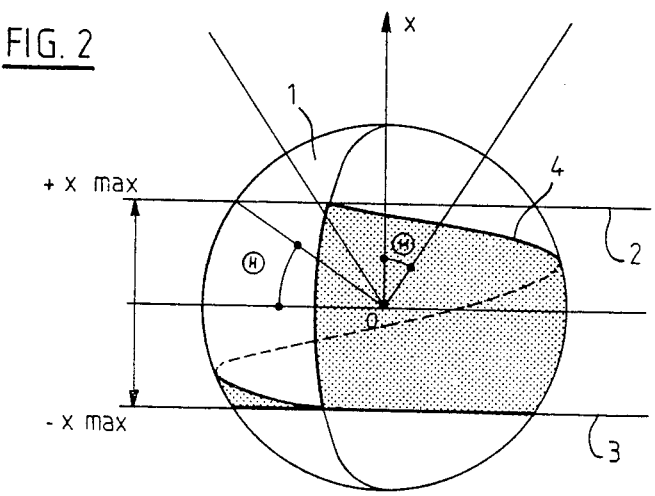
FIG. 2 shows another view of the sphere of FIG. 1.

The half-zone located between the curve 4 and the lower plane 3, shown hatched grey in FIGS. 1 and 2, is arranged to absorb all or part of the rays, for example light rays, received by the sphere and coming from an ordinary illumination. The rest of the sphere is, on the contrary, wholly or partly reflecting, the condition being that the albedos of these two sectors are substantially different. The albedo is what may be called the coefficient of reflection.

The axis of rotation Ox of the Sphere 1 is, in known manner, materialised and fixed on a gimbal-type suspension (not shown) which allows it any rotation about the axes perpendicular to axis Ox.

It will then be seen why this sphere of the device is fast with the gyroscope or is even an element thereof.

It is known that, during a gyroscopic movement, the natural axis of rotation, in the present case Ox, is animated by a movement of precession, defined by a cone with semivertex angle O, equal to Θ and of axis OX.

Figure 3:
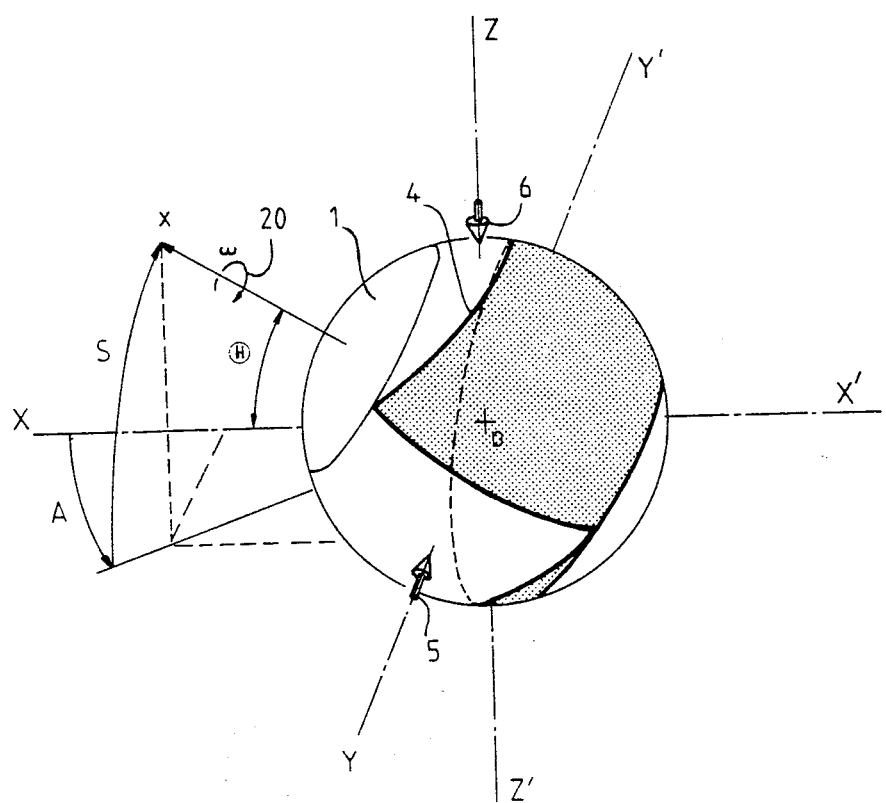
FIG. 3 shows an overall view of the device comprising the sphere of FIGS. 1 and 2 and the sensors.

FIG. 3 shows that the position of the axis Ox is shown, on the one hand, by its elevation, i.e. by the angle S that it makes with a plane containing the axis OX and an axis perpendicular to OX, or OY, and, on the other hand, by its azimuth, i.e. the angle A which it makes with a plane containing an axis OX, and an axis perpendicular both to OX and to OY, this axis being designated by OZ.

OX, OY and OZ shall hereinafter be called the reference axes of the gyroscope. They define an orthonormed reference.

It is easily verified, by spherical trigonometry, that $$\cos \Theta \leq \cos S \cdot \cos A.$$

In addition, it will be verified hereinafter that, for the measurement of the position of axis Ox to be possible, it is necessary that $$X_{max} \geq R \sin \Theta,$$

R being the radius of the sphere.

The device according to the example of FIG. 3 further comprises two sensors or photoelectric detectors 5, 6 (FIG. 3), placed in the immediate proximity of the sphere. The sensor 5 is placed on axis OY and sensor 6 is placed on axis OZ.

Il will be appreciated that the individual sensors will not deliver the same signal depending on whether they are facing an absorbent or reflecting part.

In this way, depending on the position of the axis Ox with respect to the reference axis OX, said position determined by the angles A and S, it will be understood that, at given speed of rotation ω of the sphere 1 about the axis Ox, the absorbent zones defined hereinabove will face each of the sensors for a more or less long period of time.

Finally, at the output of each of the sensors, a rectangular periodic signal is obtained whose instantaneous period is equal to $2\pi/\omega$ and of which the cyclic ratio is a function of the azimuth and the elevation of the axis Ox.

It will be demonstrated, by simple calculations of spherical trigonometry, that, the sensors being placed in the above-mentioned positions, the following equations are verified:

$$\text{for sensor 5:} \left( 2 \frac{\tau}{T} - 1 \right) = \frac{\sin S}{\sin |S_{max}|} \equiv \cos \alpha_2$$

$$\text{for sensor 6:} \left( 2 \frac{\tau}{T} - 1 \right) = \frac{\sin A \cos S}{\sin |S_{max}|} \equiv \cos \alpha_1$$

τ/I being the cyclic ratio of the rectangular wave furnished by each of the sensors, and more precisely the ratio between the duration τ during which the absorbent sector faces the corresponding sensor, and the total duration T of a revolution of the sphere 1, and $\cos \alpha_1$ and $\cos \alpha_2$ are the instantaneous director cosines of the axis Ox.

It is perfectly well known, by conventional electronic techniques, to obtain from a rectangular signal its cyclic ratio. As to the director cosines, these are the cosines of the angles $\alpha_1$ and $\alpha_2$ which the axis Ox makes respectively with the axes OY and OZ.

For the measurement to be correctly effected, each sensor must remain permanently opposite the zone of the sphere defined by the planes 2 and 3. In fact, in the contrary case, at least one of the two sensors would deliver a non-significant signal, as it would face a non-significant sector of the sphere at least once per revolution. As has been stated hereinabove, and if Θ is the maximum angle of precession, i.e. the semi-vertex angle O of the cone of precession, the following relation must therefore be respected:

$$x_{max} = R \sin \Theta$$

The preceding calculations may be further simplified by defining the curve 4 by the equation:

$$\lambda = \lambda_{max} \left( \frac{\theta}{\pi} - 1 \right)$$

for θ included in the distance [O, 2π] (2) where λ no longer represents the abscissa of the point of the curve, but its latitude; calculations then give:

$$\text{for sensor 5:} \left( 2 \frac{\tau}{T} - 1 \right) = \frac{S}{|S_{max}|} \equiv \cos \alpha_2$$

$$\text{for sensor 6:} \left( 2 \frac{\tau}{T} - 1 \right) = \frac{A \cdot \cos S}{|S_{max}|} \equiv \cos \alpha_1.$$

It should be noted that the sensors 5 and 6 are not necessarily located on the axes OY and OZ. The preceding values may be obtained, but by means of more complex calculations of spherical trigonometry.

It will be noted that the planes 3 and 4 may be spaced apart until they become planes tangential to the sphere at its poles.

A first embodiment of a measuring device has therefore been described which, under certain conditions, makes it possible to measure more or less precisely the director cosines of the natural axis of rotation of the gyroscope, but which presents drawbacks, and in particular the fact that T and τ depend on the speed of rotation of the gyroscope.

Figure 4:
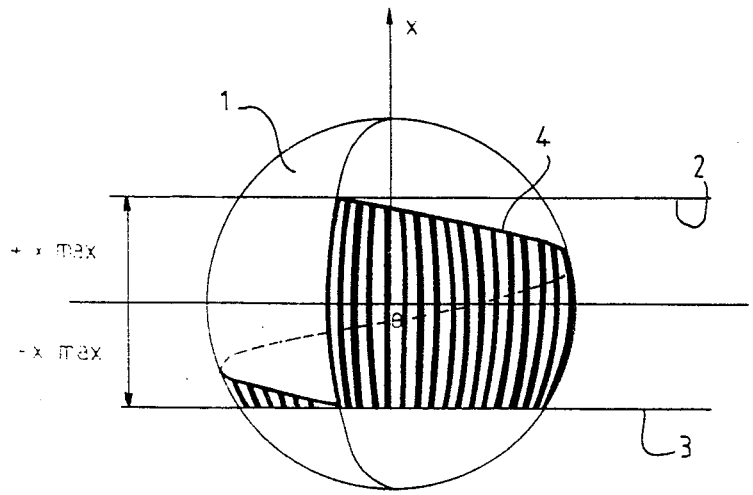
FIG. 4 shows a view similar to that of FIG. 2, but of a second embodiment of the sphere of the invention.

The purpose of a second embodiment is to overcome this drawback. FIG. 4 shows that the absorbent zone (hatched grey in FIGS. 1 to 3) is replaced by a succession of alternately absorbent and reflecting meridian lines, of equal thicknesses, and extending from the curve 4 towards the lower plane 3.

Thus, the preceding measurement of T and τ may be replaced by a count, for example that of the number of absorbent zones which have faced the detectors during one revolution, the signals furnished at the output of the detectors being in the form of pulse trains.

It will be understood that the measurement no longer depends on the speed of rotation of the gyroscope.

In fact, in the preceding calculations, it suffices to replace T by the maximum number of absorbent lines on the sphere, i.e. in the present case, by the number of lines in plane 3 ($x = -x_{max}$ or $\lambda = -\lambda_{max}$) and τ by the number of absorbent lines counted namely the number of pulses of each train.

It will be noted that, instead of considering two half-zones of different albedos, or one half-zone provided with alternately absorbent and reflecting meridian lines, a half-zone with albedo which is progressively variable, according to a predetermined law, may also be provided.

Figure 5:
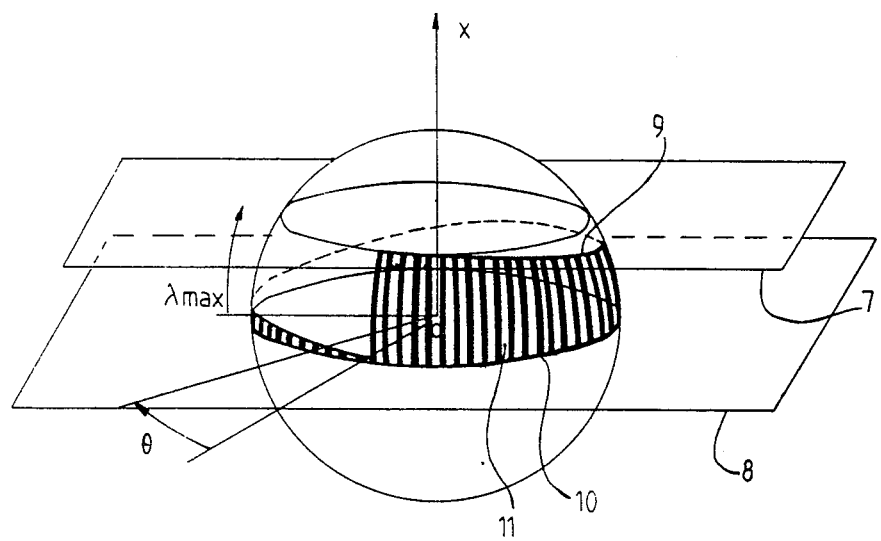
FIG. 5 shows a view in perspective of a third embodiment of the sphere according to the invention.

A variant of the device according to the invention is shown in FIG. 5.

In this variant, the portion of sphere is defined by two planes 7, 8 of respective equations $\lambda = +\lambda_{max}$ and $\lambda = O$.

The curve 9, of equation $\lambda = f(\theta, \text{mdd } \pi)$ is then defined by a monotonic function such that $f(O) = \lambda_{max}$ and $f(2\pi) = O$.

It may for example be possible to choose:

$$\lambda = \lambda_{max}\left(\frac{\theta}{2\pi} - 1\right) \quad (3)$$

where $\lambda$ represents the latitude of the point of the curve, or $$x = x_{max}\left(\frac{\theta}{2\pi} - 1\right) \quad (4)$$

where x represents the abscissa of the point of the curve, such that $\lambda_{max}$ is the latitude of the point corresponding to an abscissa $x_{max}$.

Similarly, alternately absorbent and reflecting meridian lines 10 and 11 respectively are disposed between the curve 9 and the plane 8.

However, this variant requires the use on each axis OY and OZ of two diametrically opposite sensors (not shown).

In this case, whatever the azimuth and elevation of the axis of rotation of the gyroscope, only one of the two sensors of the same pair will see the meridian lines pass.

From the signal of this sensor will be obtained the absolute value of the angle A or S, depending on the couple of sensors in question; the sign of this angle will change according to whether it is one or the other of the sensors of the same pair which sees the lines pass.

This variant therefore provides a device which is just as efficient as the one previously described, and which may be used in the event of it being impossible to provide for the gyroscope or the spinner a portion of sphere extending on either side of its equator.

In addition, in the above-described devices, it has been envisaged to define the absorbent or hatched zone by one curve only, of period $2\pi$.

It is also possible to define about the portion of sphere not one curve, but a whole number of curves, for example n curves whose equations are:

$$\lambda = \lambda_{max}\left(\frac{n\theta}{\pi} - 2i - 1\right) \quad (5)$$

over the distance $2i\pi/n$ for $i=0, \ldots n-1$

The advantage of such a model lies in the fact that counting is effected in this case n times per revolution, instead of once, as before.

The coordinates of the axis of rotation are thus determined with greater accuracy.

A few embodiments of the device according to the invention will be described hereinafter:

EXAMPLE 1

On a sphere of diameter 50 mm are traced 128 reflecting lines and as many absorbent lines, defined by the curve as shown in FIG. 1 and such that $\lambda_{max}=30°$.

The width of each line is 0.61 mm, and the increment in length between two absorbent lines is 0.2 mm.

For the measurement to be of optimum precision, the diameter of the sensitive part of the detectors must be at the most equal to the smaller of these two dimensions, 0.2 mm in the present case.

However, in this case, the theoretical maximum precision is not attained since, with this detector of diameter 0.2 mm, a sampling rate more rapid than with lines of 0.61 mm could be obtained.

EXAMPLE 2

On a sphere of diameter 50 mm are traced 3 groups of 128 reflecting lines and as many absorbent lines distributed respectively between the 3 curves defined by the equation (5) with $n=3$ and $\lambda_{max}=30°$.

An increment in length of the lines in each group of 0.2 mm is thus obtained, in identical manner of Example 1. However, in the present example, it will be understood that the width of these lines is now no more than about 0.2 mm, likewise. Thus, with a detector of diameter 0.2 mm, optimum precision is obtained both for the detection of the end of the hatched zone and for the sampling rate.

The position of the axis of rotation is then measured, by its director cosines, three times per revolution.

More generally, it is each time possible, to improve precision, to choose a number of curves n such that, for a given number of lines in each sector defined by these curves, the increment in length of the lines and the width thereof are as close as possible to each other.

It may here be demonstrated that this number n in fact depends only on the value of $\lambda_{max}$ chosen, i.e. indirectly, on the authorised value of the angle of precession of the gyroscope.

Let n be the number of curves about the sphere, n having to be chosen. N represents the number of absorbent lines in each of the n sectors defined by these curves. The maximum length l of the lines is in fact the length of the meridian arc separating the planes $\lambda=\lambda_{max}$ and $\lambda=-\lambda_{max}$. If R is the radius of the sphere, then $l=2\lambda_{max}\cdot R$.

The increment in length of the lines is then $$\frac{2\lambda_{max} \cdot R}{N}$$

As to the width of the lines, it is $$\frac{2\pi \cdot R}{n} \times \frac{1}{2N}, \frac{2\pi R}{n}$$

representing the maximum length of each of the n sectors, transversely to the lines, and 2N the total number of lines (absorbent and reflecting).

Maximum precision is obtained when $$\frac{2\lambda_{max} \cdot R}{N} = \frac{2\pi \cdot R}{n} \cdot \frac{1}{2N}$$

and when these two values are equal to the diameter of the detector. In this way, $$n = \frac{2\pi}{4\lambda_{max}}$$

is obtained.

The above calculations are also valid when the sectors in question no longer contain a succession of alternately absorbent and reflecting lines, but a totally absorbent surface, contrain to the rest of the sphere.

In addition, several embodiments of the device have been described above, making it possible to measure only the position of the natural axis of rotation of the gyroscope, without knowing its instantaneous coordinates. However, the signals furnished at the output of the detector may be envisaged to be indicative of the instantaneous position of the gyroscope. In fact, it will be appreciated that, at the moment when a detector ceases to face the hatched region, i.e. the moment when the detector intersects the curve, for example the curve of equation (2), the angle through which the gyroscope has rotated, with respect to the beginning of count position, from the number of absorbent lines counted, is known.

Of course, to this end, the direction of rotation of the gyroscope must be such that it is with the longest lines that counting begins (direction of arrow 20 in FIG. 3), in order to have a reference. In fact, whatever the position of the axis of rotation, Ox, the beginning of detection of the hatched zone then always corresponds to $\theta = 0$.

As has been stated, the functioning of the device in its improved version is based on the fact that the sphere, or portion of sphere, comprises alternately reflecting and absorbent sectors. Moreover, a highly precise style of design is necessary. However, as the sphere is not a developable surface, the known techniques of engraving employing a mask and a photosensitive varnish cannot be used in the present case.

An example of a process for engraving the sphere is described hereinafter.

A nickel-plated sphere coated over the whole of its surface with a fine layer of gold, then, with a photosensitive varnish, is used.

The sphere is enveloped tangentially at its equator, in a vertical cylindrical mask comprising a vertical slot, calibrated in width along the meridian circle of tangency, i.e. so that its orthogonal projection of the sphere is of constant width. The slot may be partially or entirely masked by a mobile mask.

The sphere is then rotated, simultaneously with the mobile mask.

Then, at regular intervals, an ultra-violet radiation is applied on the sphere, through the slot, and locally isolates the varnish.

The displacement of the mobile mask and the sphere is such that the insolated regions then consist of meridian bands, of constant width and extending between the curve defined by one of the equations (1) to (4) and the corresponding lower plane of delimitation.

The varnish is then stripped, and the layer of gold appearing in the insolated regions is chemically etched, to allow the nickel to appear. The nickel is then blackened electrolytically and, finally, the residual varnish is eliminated. In this way, a succession of meridian lines is obtained, constituted alternately by polished gold and blackened nickel, i.e. alternately reflecting and absorbent.

Of course, due to this process, all the spheres corresponding to the embodiments described hereinabove may be made by an appropriate choice of the width of the slot of the cylindrical mask, and of the evolutions of the mobile mask as a function of the rotation of the sphere. Operation is such when it is intended to obtain the sphere of the embodiment of FIG. 1, by permanently insolating during the displacement of the sphere and the mobile mask.

Finally, modifications may be made to the device and process according to the invention, without departing from the scope thereof, particularly concerning the structure and arrangement of the reflecting and absorbent zones, the type of detector, etc.

However, it should be noted that the detectors may for example be of the optical fibre type, the section of the pick-up fibre being placed in the immediate vicinity of the surface of the sphere.

However, the invention as described above is not limited to visible radiations and is also applied to infrared radiations.

In addition, the scope of the invention would not be exceeded if only one sensor is provided, to obtain only one coordinate of the axis of which the orientation is to be determined.

What is claimed is:

1. Device for determining the orientation of an axis, mobile about a point, of a solid in rotation about this axis, particularly a gyroscopic spinner, wherein said device comprises a portion of sphere centered on said point of said axis, of which the surface of said portion of sphere comprises at least two parts which are respectively absorbent and reflecting for a given radiation and one of said two parts has alternately absorbent and reflecting meridian lines, and sensor means sensitive to the radiation reflected by the sphere, the reflecting and absorbent parts being shaped so that the sensor means deliver signals characteristic of the orientation of said axis.

2. The device of claim 1, wherein the surface of the sphere is divided into two parts by a curve of which the equation is a monotonic function.

3. The device of claim 2, wherein the surface of the portion of said sphere is divided into 2n parts by n curves.

4. The device of claim 2, wherein at least one of the two parts has a progressively variable albedo.

5. The device of claim 2, wherein one of the two parts of the surface of the sphere comprises alternately absorbent and reflecting meridian lines.

6. The device of claim 5, wherein said equation defining the latitude of a point of the curve is:

$$\lambda = \lambda_{max}\left(\frac{\theta}{\pi} - 1\right)$$

wherein $\theta$ is the rotation angle of the sphere.

7. The device of claim 1, wherein the surface of the sphere is divided into 2n parts by n curves of which the equations are monotonic functions.

8. The device of claim 7, wherein the equations defining the latitude of a point of the curves are $$\lambda = \lambda_{max}\left(\frac{n\theta}{\pi} - 2i - 1\right)$$

wherein $\theta$ is the rotation angle of the sphere and
i = 0, 1 ... n−1 and $$\frac{2i\pi}{n} \leq \theta \leq \frac{2(i+1)\pi}{n}.$$

9. The device of claim 8, wherein n for maximum precision is chosen to be close to the ratio $$\frac{2\pi}{4\lambda_{max}}.$$

10. The device of one of claims 1 to 9, wherein the solid is animated by a movement of precession and two sensors are provided, located in the plane passing through the centre of the sphere and perpendicular to the axis of the cone of precession of the solid.

11. The device of one of claims 1 to 5, wherein said equation, defining the latitude of a point of the curve is:

$$\lambda = \lambda_{max}\left(\frac{\theta}{2\pi} - 1\right).$$

and two pairs of sensors are provided, wherein $\theta$ is the rotation angle of the sphere.

* * * * *